March 3, 1931. T. MILLDOWN 1,795,260
PIE REMOVING DEVICE
Filed March 3, 1930
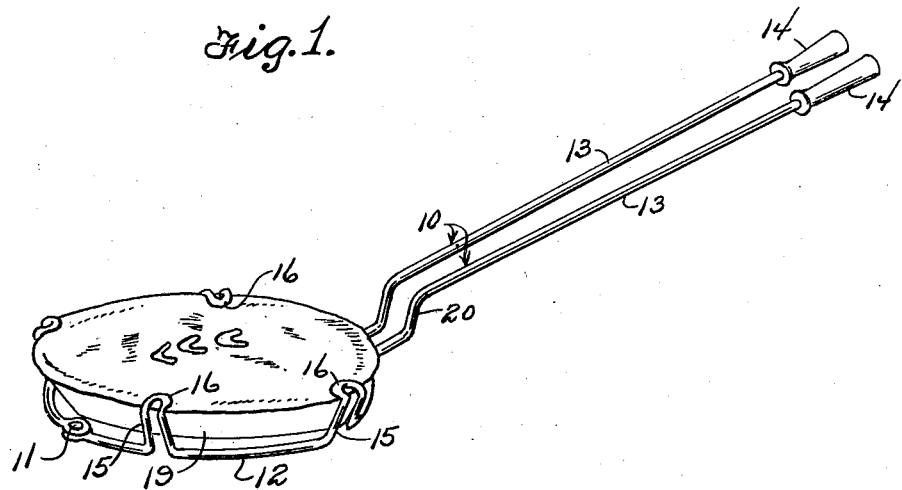
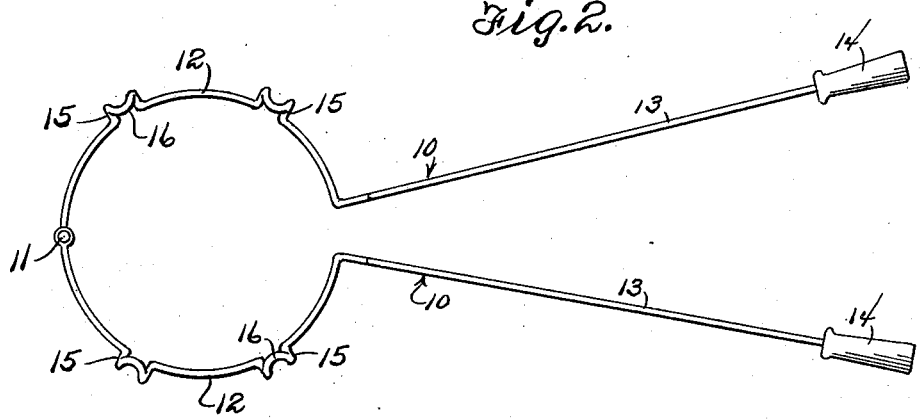
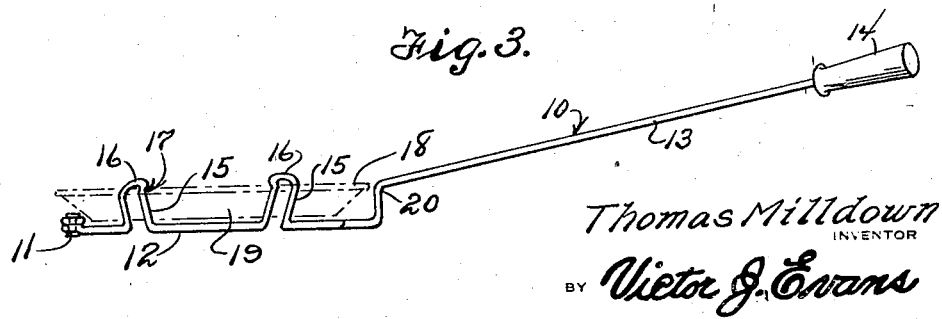
Thomas Milldown
INVENTOR
BY Victor J. Evans
ATTORNEY Patented Mar. 3, 1931

1,795,260

UNITED STATES PATENT OFFICE

THOMAS MILLDOWN, OF RED LODGE, MONTANA

PIE-REMOVING DEVICE

Application filed March 3, 1930. Serial No. 432,854.

This invention relates to plate handling devices especially designed for use in cooking, an object being to provide a device by means of which plates may be placed into or removed from an oven, the invention being especially useful when baking pies.

Another object of the invention is the provision of a device of simple and economical construction, by means of which pie and other plates may be easily gripped and released to facilitate handling, and which will grip the plate and hold the same spaced above the plane of the bottom of the device and out of contact with its support.

With the above and other objects in view, the invention further includes the following novel features and details of construction, to be hereinafter more fully described, illustrated in the accompanying drawings and pointed out in the appended claims.

In the drawings:—

Figure 1 is a perspective view illustrating the use of the invention.

Figure 2 is a top plan view of the invention per se.

Fig. 3 is an edge view showing the device in use, a plate being shown by dotted lines.

Referring to the drawings in detail wherein like characters of reference denote corresponding parts, the reference character 10 indicates a pair of members which are pivotally connected at one end as shown at 11, so that these members may be relatively moved.

Each of the members comprises a semi-circular arm 12 which extends from the point of pivotal connection 11, and from which extends a handle 13, the latter being provided with a grip 14. The members are arranged with the semi-circular arms opposed and extending upwardly and outwardly from these arms are spaced loops 15. The upper ends of the loops terminate in inwardly inclined portions 16 so that angular seats 17 are formed to receive the upper edges 18 of a pie or other plate 19.

The device is designed to accomodate plates of different diameters and the loops 15 are so spaced as to conform to the edge of either a ten or eight inch plate.

The length of the loops is such as to space the bottom of the plate above the plane of the bottom of the device so that the device may be temporarily rested upon a table or other support while gripping a hot plate, without injury to the support.

The handles 13 are offset with respect to the arms 12 shown at 20 and each of the members 10 is preferably formed from a single length of material as shown in the drawings.

In use, the device is opened and placed around a plate, the handles then being moved inward so that the inclined loops 15 will engage the edges of the plate and will raise the latter vertically so that the edge of the plate will enter the seats 17. When a plate is to be deposited, the handles 13 are gradually separated so that the plate will slide down the inclined loops upon a support. This adapts the device for handling china, glass or other fragile plates as well as aluminum or other metal plates.

The invention is susceptible of various changes in its form, proportions and minor details of construction and the right is herein reserved to make such changes as properly fall within the scope of the appended claims.

Having described the invention what is claimed is:

1. In a plate lifter, a pair of opposed semi-circular plate receiving arms pivotally connected at one of their ends, handles extending from the other ends of said arms, and spaced means extending from the arms to grip the edges of a plate.

2. In a plate lifter, a pair of opposed semi-circular plate receiving arms pivotally connected at one of their ends, handles extending from the other ends of said arms, and outwardly inclined plate gripping elements extending from said arms.

3. In a plate lifter, a pair of opposed semi-circular plate receiving arms pivotally connected at one of their ends, handles extending from the other ends of said arms, outwardly inclined plate gripping elements extending from said arms, and seats provided at the ends of the gripping elements remote from the arms.

4. In a plate lifter, a pair of members pivotally connected at one of their ends, each of said members being formed from a single length of material and comprising a semicircular arm, spaced plate engaging loops provided in said arm and extending upwardly therefrom, angular seats provided in the upper ends of the loops, and a handle extending from the arm remote from the pivotally connected end of the members.

In testimony whereof I affix my signature.

THOMAS MILLDOWN.